United States Patent

Enomoto

[11] Patent Number: 5,267,507
[45] Date of Patent: Dec. 7, 1993

[54] COFFEE MAKER

[76] Inventor: Kazuo Enomoto, 7-1-5 Sumiyoshi-miyacho, Higashinada, Kobe, Hyogo 658, Japan

[21] Appl. No.: 986,114

[22] Filed: Dec. 4, 1992

[30] Foreign Application Priority Data

Dec. 4, 1991 [JP] Japan ............... 3-348871

[51] Int. Cl.⁵ ........................................ A47J 31/42
[52] U.S. Cl. ........................................ 99/286; 99/300; 241/65; 241/101.2
[58] Field of Search ................ 99/286, 290, 295, 300, 99/304, 305, 306, 307, 302 R; 426/433; 241/101.2, 65

[56] References Cited

U.S. PATENT DOCUMENTS

| | | | |
|---|---|---|---|
| 4,172,413 | 10/1979 | Roseberry | 99/286 |
| 4,555,984 | 12/1985 | Yamashita | 99/286 |
| 4,895,308 | 1/1990 | Tanaka . | |
| 5,083,502 | 1/1992 | Enomoto . | |

FOREIGN PATENT DOCUMENTS

| | | |
|---|---|---|
| 3518243 | 6/1956 | Japan . |
| 1-190317 | 7/1989 | Japan . |
| 1-190318 | 7/1989 | Japan . |
| 2-237519 | 9/1990 | Japan . |
| 3-16128 | 3/1991 | Japan . |
| 3-251212 | 11/1991 | Japan . |
| 4-40916 | 2/1992 | Japan . |
| 4-224719 | 8/1992 | Japan . |

*Primary Examiner*—Robert W. Jenkins
*Attorney, Agent, or Firm*—Marshall, O'Toole, Gerstein, Murray & Borun

[57] ABSTRACT

This disclosure relates to a coffee maker in which disposal of the used coffee grounds and cleaning after brewing can be performed easily, and which is capable of being reused immediately. It is a fully automatic coffee maker in which a roaster which roasts raw coffee beans, a cooler means which cools the coffee beans roasted by the roaster, a grinder means which grinds the beans and supplies the ground coffee, and a water heater and supplier which heats and supplies the water from a water tank, are all contained inside an outer case 1. A space S is formed in a part of the outer case for the placement of a decanter 3 which functions as a receptacle for the brewed coffee, and, moreover, the ceiling part of the decanter placement space is provided with a coffee drop-supply opening for the ground coffee beans, water drop-supply openings around the coffee drop-supply opening for the heated water, and a securing means 4 which holds in a freely detachable manner a filter basket 2 which catches the drop-supplied ground coffee beans and hot water and brews the coffee.

2 Claims, 2 Drawing Sheets

COFFEE MAKER

FIELD AND BACKGROUND OF THE INVENTION

This invention relates to a coffee maker capable of providing freshly brewed coffee from raw coffee beans through a process of roasting, grinding, and brewing the coffee.

The applicant has previously proposed coffee makers capable of providing coffee completely automatically from raw or green coffee beans, as described in Japanese patent early publication Hei. 2-237,519 dated 9/20/90, early publication Hei. 3-251,212 dated 11/8/91, and early publication Hei. 4-40916 dated 2/12/92. The coffee makers described therein are equipped with a roaster which roasts the raw coffee beans, a combination mill-brewing unit which grinds the roasted coffee beans and then brews and filters the coffee from the ground beans, a blower unit which blows cooling air into said combination mill-brewing unit to cool the roasted beans before grinding, a water supply unit which pours hot water into said combination mill-brewing unit, and a coffee server which collects the coffee which has been brewed and filtered by said combination mill-brewing unit. In addition, with the fully automatic coffee maker proposed in Japanese patent early publication Hei. 4-224719 (laid open 8/14/92), there is provided a temporary holding tank separate from the combination mill-brewing unit, and the roasted coffee beans are first collected into this temporary holding tank, where they are cooled by a blower unit before being transferred to the combination mill-brewing unit.

However, with the coffee makers of the prior art described above, because the grinding of the coffee beans and the brewing of the coffee were carried out in the same container, the cutter blades for the mill were located inside the brewing container, and as a result, disposal of the used coffee grounds and cleaning after brewing were troublesome, requiring both time and labor. In addition, because of this drawback, if it were desired to use the coffee maker more than once continuously, it would not be possible to reuse it immediately after each previous was.

Thus, a primary objective of this invention is to provide a coffee maker which solves the problems of the prior art described above; in other words, the coffee maker provides for easy disposal of the used coffee grounds and cleaning after brewing, and which is capable of being reused immediately.

SUMMARY OF THE INVENTION

The foregoing objective is attained by a coffee maker according to this invention which is fully automatic and includes a roaster which roasts raw coffee beans, cooling means for cooling the coffee beans roasted by the roaster, grinding means for grinding the beans and supplying the ground coffee, and heating and water supply means which heats and supplies the water from a water tank, all contained inside an outer case. A space is formed in a part of the outer case for the placement of a decanter which functions as a receptacle for the brewed coffee, and moreover, the ceiling part of the decanter placement space is provided with a drop-supply opening for the ground coffee beans, drop-supply openings for the heated water, and securing means for securing in a freely detachable manner a filter basket which catches the drop-supplied ground coffee beans and the hot water for brewing coffee.

In addition, in a coffee maker according to this invention, the ground coffee drop-supply opening is provided substantially in the center, and around this opening are arranged multiple hot water drop-supply openings.

With the foregoing construction, the coffee maker performs all the steps from the roasting of the coffee beans to the brewing of the coffee. A person places a drip filter in the filter basket and secures the filter basket to the ceiling part of the decanter placement space. The ground coffee beans are drop.supplied from the ceiling part into the filter basket, hot water is also drop-supplied into the filter basket and brewed coffee is dripped into the decanter. When the dripping is completed, the preparation for reuse is completed simply by opening the filter basket and removing the filter along with the coffee grounds, and inserting a new filter.

In addition, because the hot water drops in the area surrounding the part where the ground coffee beans drop, the hot water is poured uniformly with respect to the ground beans, thus making possible more uniform brewing of the coffee. Furthermore, the scattering of the ground coffee powder is restrained by the curtain of hot water falling around it.

BRIEF DESCRIPTION OF THE DRAWINGS

The invention will be better understood from the following detailed description taken in conjunction with the accompanying figures of the drawings, wherein.

DETAILED DESCRIPTION OF THE INVENTION

Figure 1:
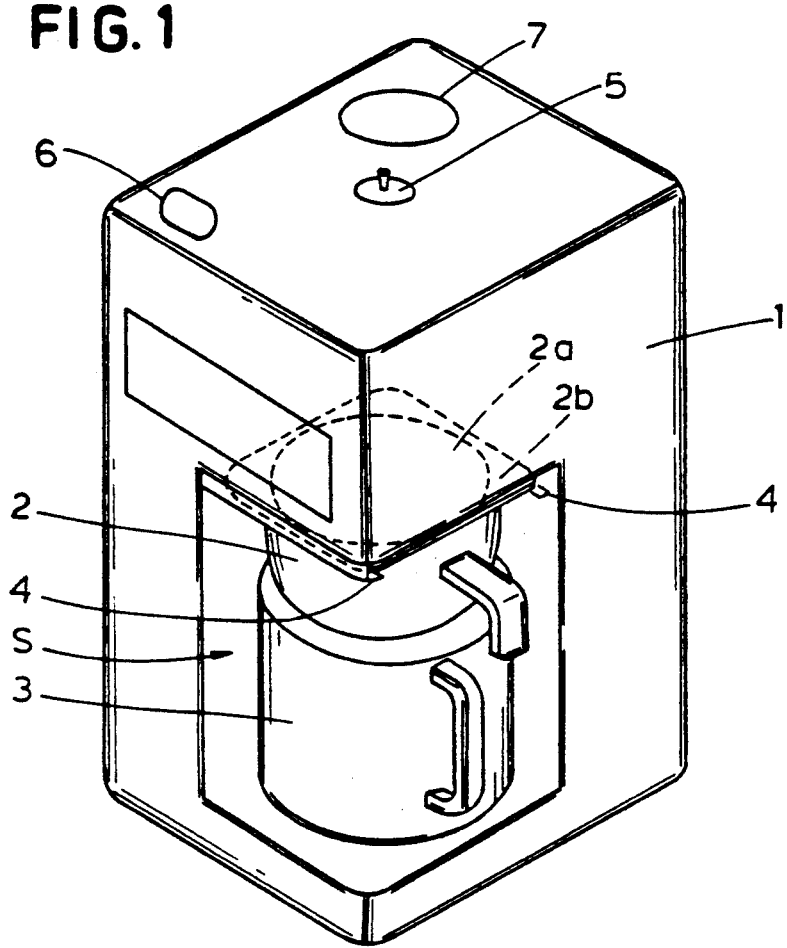
FIG. 1 is an overall perspective view of a preferred embodiment of the coffee maker in accordance with this invention.

With reference first to FIG. 1, inside an outer case 1 are contained all of the major components of the coffee maker with the exception of the filter basket 2 and the decanter 3. The decanter 3 is a container for the purpose of catching the dripped coffee, and it is placed in a decanter placement space S which is formed by shaping a part of the outer case 1 into a concave shaped opening. In addition, the filter basket 2 is a funnel or container-shaped component for the purpose of filtering and dripping the brewed coffee, and a filter is placed in a freely removable manner into this filter basket along the inner walls of the basket. For this filter it is possible to use a disposable type such as a paper filter.

On both sides of the ceiling part 9 of the decanter placement space S, securing or supporting guides 4 are provided as a means of supporting the filter basket 2. The filter basket 2 is installed by inserting it so that the flanges 2b on the side edges of the basket 2 rest on the securing guides 4. In addition, the basket 2 can be easily removed by sliding out the basket on the guides 4, thus allowing the filter to be freely removed.

In the top of the outer case 1 are provided a coffee bean supply opening 5, a water supply opening 6, and an exhaust opening 7 for the roaster 10, which will be described later.

A roaster 10 is provided in the uppermost part within the outer case 1. This roaster 10 is designed to roast the raw coffee beans which are placed inside, and it is comprised of an aluminum container 11. Inside this container 11 is provided a stirring blade 12 at the lower part of the container 11, a sheathed heater 13 for roasting at the upper part of the container 11, and a high-temperature catalyst filter 14 for smoke and odor removal. In addition, a coffee bean discharge door 15 is provided at a section of the bottom of the container 11 and this door is designed so that it can be opened and closed by a solenoid 16. A temperature sensor 17 is also installed on the underside of the bottom of the container 11, and it detects the completion of roasting by sensing the temperature at the underside of the container. A stirring motor 18 turns the stirring blade 12 via an anti-thermal-conduction joint 19. Furthermore, in order to prevent any adverse effects from the radiation of heat from the container 11, which is a source of heat radiation, a radiant heat blocking plate 8 is arranged below the container 11, thus isolating the compartment in which the roaster 10 is located from the stirring motor 18, and also from other components such as the cooling means and controller, which will be described later. This radiant heat blocking plate 8, unlike the synthetic resin of the outer case 1, is preferably composed of an iron plate.

Beneath the discharge door 15 of the roaster 10, a cooler 20 is provided as an independent means of cooling the roasted coffee means. This cooler 20 is comprised of a blower case 21, a temporary holding tank 22 located inside the blower case, and a blower 23 which draws in and blows cooling air from the outside. The temporary holding tank 22 features a mesh construction for at least its lower half, thus allowing the air blown in by the blower 23 to enter from the lower half of the temporary holding tank 22 and then escape upwardly. At the bottom of the temporary holding tank 22 are provided an optical sensor 24 for detecting any remaining coffee beans, and a drop shutter or door 25. Cooling air exhaust holes 26 are provided in the radiant heat blocking plate 8 above the tank 22.

A grinder 30 is provided separately beneath the temporary holding tank 22 of the cooler 20 as a means for grinding the coffee beans, and this grinder 30 is a mill type grinder. Beneath the coffee bean receiving opening 31 is located a feed screw 33 which is turned by a drive motor 32 that is equipped with a speed reducer, and at the end, in the conveying direction, of this feed screw 33 is located a mill unit comprised of a revolving mill tooth 35 secured to the end of the feed screw 33, and a stationary mill tooth 34. The coffee beans are ground between the revolving mill tooth 35 and the stationary mill tooth 34. The fineness to which the beans are ground is adjusted by turning an adjustment knob 36 in order to adjust the gap between the revolving mill tooth 35 and the stationary mill tooth 34. Beneath the mill unit is provided a discharge opening 37 for the ground coffee beans.

The means for heating and supplying the water for the brewing of the coffee comprises a water tank 40, a vertical boiler 50, and a hot water supplier 60. The water tank 40 collects the water which is poured in through the water supply opening 6 (FIG. 1), and supplies it to the bottom to the vertical boiler 50 via a water supply pipe 41 which is connected to the bottom of the tank 40. Although the water tank 40 in this embodiment is a stationary type, it is also possible for it to be a cassette type capable of being freely inserted and removed. At the bottom of the water tank 40 is provided a tank-empty sensor 42 which detects when the tank is out of water. In addition, by providing a narrow neck 43 partway along the water supply pipe 41, it is possible to prevent the reverse flow of water from the boiler 50 to the tanks 40, and to effectively cause the water heated by the boiler 50 to flow upwardly through the hot water supply pipe 53 to the hot water supplier 60. The vertical boiler 50 has a heater 51 embedded inside its peripheral wall, and a steam collector 52 provided at its top. The hot water supply pipe 53 is connected to and extends vertically from the top of the boiler 50 with the upper end connected to the hot water supplier 60.

Figure 3:
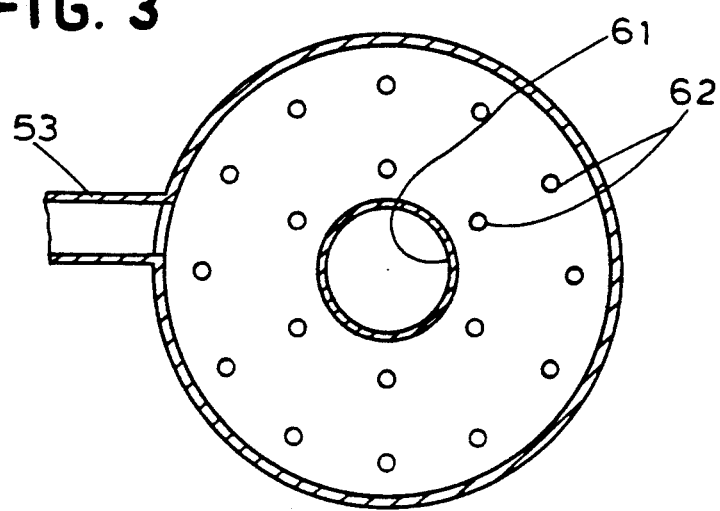
FIG. 3 is a horizontal cross-sectional view taken on the line 3—3 of FIG. 2.

The hot water supplier 60 is comprised of a ring-shaped container provided with a through-hole 61 at its center, thereby forming an annular flow passage, and in the bottom wall of the container, multiple hot water drop-supply openings 62 are provided concentrically around the through-hole 61. By fitting the discharge opening 37 of the grinder 30 into the through-hole 61, the through-hole 61 becomes a drop-supply opening 61 for the ground coffee beans. This ground coffee drop-supply opening 61 and the hot water drop-supply openings 62 arranged concentrically around it face downwardly toward the decanter placement space S from the ceiling part 9 of the space S. FIG. 3 shows in more detail the locations of the openings 61 and 62.

Figure 2:
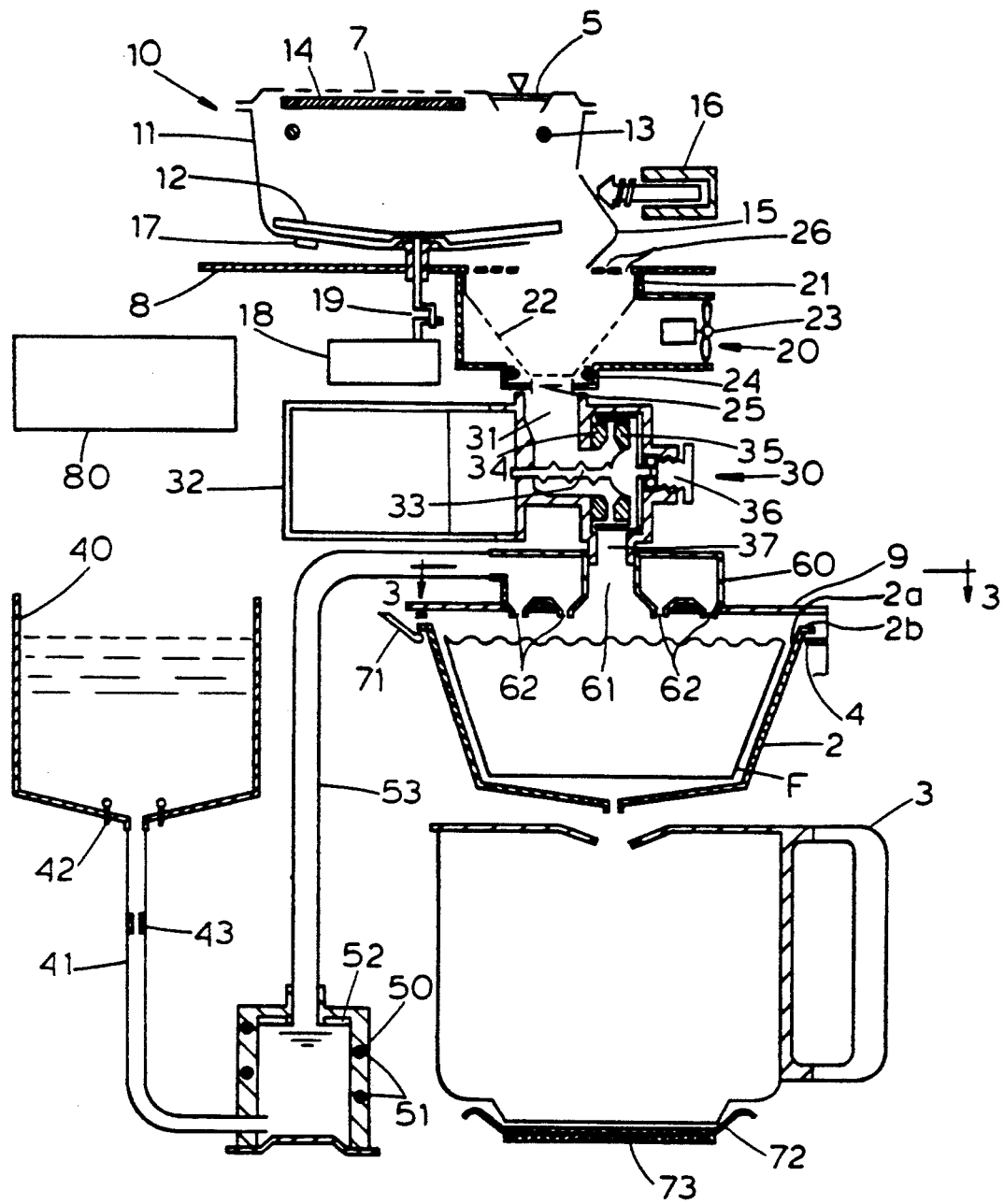
FIG. 2 is a cross-sectional diagrammatic view of the coffee maker.

A filter basket detection sensor 71 (FIG. 2) detects whether or not the filter basket 2 is secured at the appropriate position in the ceiling part 9 below the openings 61 and 62. F is a paper filter placed inside the filter basket 2. A keep-warm plate 72 is provided at the location in which the decanter 3 is placed, and 73 is a keep-warm heater. A controller 80 is located at a position below the radiant heat blocking plate 8, and it contains a microcomputer and controls the various components of the coffee maker. All of the power and control components are electrical, and a power cord (not shown) is included for connecting the coffee maker to a standard wall outlet.

In operation, after the coffee beans and the water are inserted and the unit is turned on, the raw coffee beans are roasted by the roaster 10, cooled by the cooler 20, and then ground by the grinder 30. In addition, hot water is supplied by the water heating and supply means (40, 50, and 60). Thus, by placing a filter such as the paper filter F in the filter basket 2 and inserting this filter basket 2 along the securing guides 4 so that it is secured to the ceiling part 9 of the decanter placement space S, ground coffee is drop.supplied into the filter basket 2 from the ground coffee drop-supply opening 61 in the center and, simultaneously with this dropping of the ground coffee or slightly after, hot water is drop.supplied into the filter basket 2 from the surrounding hot water drop-supply openings 62, thus producing freshly brewed coffee by the drip method. When dripping is finished, by detaching the filter basket 2, removing the used coffee grounds together with the filter 2a, placing a new filter in the filter basket 2, and re-securing the filter basket 2 to the ceiling part 9 of the decanter placement space S, the unit is prepared for reuse.

Because the ground coffee is drop.supplied into approximately the center of the filter basket 2 and the hot water is drop.supplied around it, the brewing of the coffee from the ground coffee beans by the hot water is uniform, and also the scattering of the ground coffee powder is prevented by the hot water falling around it.

With the coffee maker according to this invention as set forth in the claims, having the composition described above, in a fully automatic coffee maker including a roaster which roasts raw coffee beans, a cooler which cools the roasted beans, a grinder, and a heating and supply means which heats and supplies the water, all are contained inside a single outer case. Because the ceiling part of the decanter placement space is provided with a drop-supply opening for the ground coffee beans, drop-supply openings for the heated water, and a securing means that holds, in a freely detachable manner, a filter basket which catches the drop-supplied ground coffee beans and the hot water and brews the coffee, the preparation for drip-brewing coffee is accomplished by the extremely simple procedure of securing the filter basket in which a filter has been placed, to the ceiling part of the decanter placement space in a freely removable manner. Moreover, when drip-brewing is finished, the preparation for reuse can be completed by simply removing the filter and replacing it with a new one. Thus, with this coffee maker, the time and labor required when repeatedly making coffee over and over again are greatly reduced, especially for commercial use or similar applications.

In addition, because the ground coffee drop-supply opening is provided in the center, and around this are arranged multiple hot water drop-supply openings, the brewing of the coffee is uniform and thus it is possible to obtain good-tasting coffee through consistently reliable brewing. Furthermore, any scattering of the ground coffee powder which is drop-supplied into the filter basket is prevented by the curtain of hot water falling around it.

The disclosures of K. Enomoto, patent application Ser. No. 07/986,113, titled "Coffee Maker", and K. Enomoto, patent application Ser. No. 07/986,111 titled "Small-Capacity Coffee Roaster", both filed simultaneously herewith, are incorporated herein by reference.

What is claimed is:

1. A fully automatic coffee maker for making brewed coffee, comprising a case, a roaster mounted in said case for roasting raw coffee beans, cooling means mounted in said case adjacent said roaster for cooling the coffee beans roasted by said roaster, grinding means mounted in said case for receiving said coffee beans from said cooling means for grinding said beans and supplying ground coffee, a water tank mounted in said case, and a heating and supply means in said case and connected to said water tank for heating and supplying the water from said water tank, said case having space formed therein for the placement of a decanter which functions as a receptacle for the brewed coffee, said space having a ceiling part and said ceiling part being provided with a coffee drop-supply opening for said ground coffee, with water drop-supply openings for the heated water, and with securing means for holding in a freely detachable manner a filter basket which catches the ground coffee and heated water and forms the brewed coffee.

2. A coffee maker as described in claim 1, wherein said coffee drop-supply opening is provided in the center of said ceiling part, and around said coffee drop-supply opening are arranged a plurality of said water drop-supply openings.

* * * * *